(12) United States Patent
Norrena et al.

(10) Patent No.: US 7,176,804 B2
(45) Date of Patent: Feb. 13, 2007

(54) PROTECTION OF POWER SEMICONDUCTOR COMPONENTS

(75) Inventors: Juha Norrena, Vaasa (FI); Risto Komulainen, Klaukkala (FI)

(73) Assignee: Vacon Oyj, Vaasa (FI)

( * ) Notice: Subject to any disclaimer, the term of this patent is extended or adjusted under 35 U.S.C. 154(b) by 128 days.

(21) Appl. No.: 11/090,066

(22) Filed: Mar. 28, 2005

(65) Prior Publication Data

US 2005/0212679 A1    Sep. 29, 2005

(30) Foreign Application Priority Data

Mar. 29, 2004    (FI) .................................. 20040462

(51) Int. Cl.
*G08B 17/00*    (2006.01)

(52) U.S. Cl. ...................... 340/588; 340/640; 340/584; 324/765; 361/93.8; 257/467

(58) Field of Classification Search ............... 340/588, 340/640, 584, 522, 653; 324/765, 766, 767, 324/768, 769; 361/93.1, 93.8, 100, 103, 361/106; 257/467, 470, 659; 374/100

See application file for complete search history.

(56) References Cited

U.S. PATENT DOCUMENTS

| | | | |
|---|---|---|---|
| 4,669,025 A * | 5/1987 | Barker et al. ............... | 361/103 |
| 5,737,169 A * | 4/1998 | Sellers ......................... | 361/98 |
| 5,821,599 A * | 10/1998 | Rupp ........................... | 257/467 |
| 6,052,268 A | 4/2000 | Thomas | |
| 6,751,080 B2 * | 6/2004 | Yamaji ......................... | 361/93.8 |
| 6,888,469 B2 * | 5/2005 | Seferian ...................... | 340/640 |

FOREIGN PATENT DOCUMENTS

JP        7-135731 A      5/1995

\* cited by examiner

*Primary Examiner*—Anh V. La
(74) *Attorney, Agent, or Firm*—Birch, Stewart, Kolasch & Birch, LLP

(57) ABSTRACT

A method and a system for protecting the power semiconductor components used in the powerstages of power electronics devices, such as frequency converters, wherein calculation modeling the degree of heating of the semiconductor junction of the power components (V11–V16) is used, wherein the degree of heating of the power components between the measurable outer surface or cooler and the internal semiconductor junction is determined on the basis of the dissipation power and a thermal network model of the component, wherein the temperature of the outer surface of the power component or the temperature of the cooler is measured, wherein the modeled temperature of the semiconductor junction is the sum of the measured temperature of the outer surface or cooler and the calculated degree of heating, and wherein, based on the modeled junction temperature, an alarm is issued or some other protective action is taken. In the method, the temperature of the semiconductor junction is calculated in real time, at least at time intervals equal to the shortest time constant in the thermal network model, on the basis of the heating caused by the dissipation power pulse produced during each current conduction cycle.

11 Claims, 3 Drawing Sheets

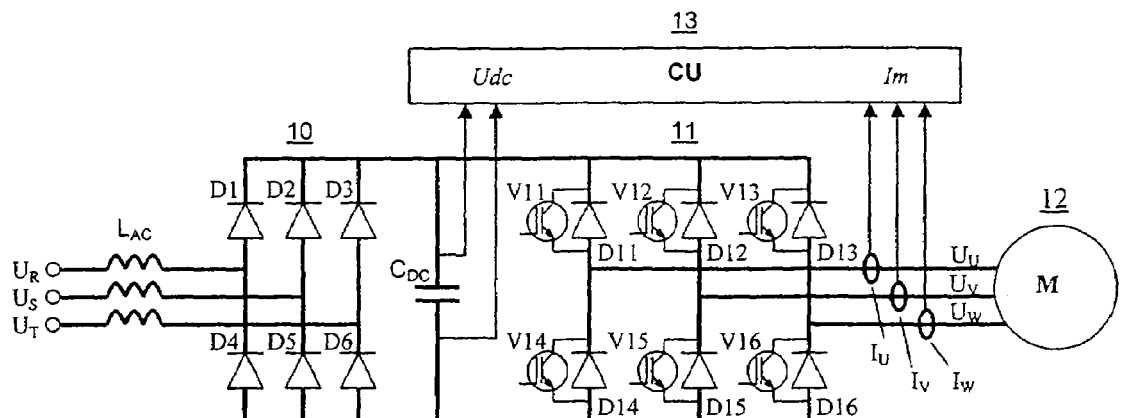
Fig. 1
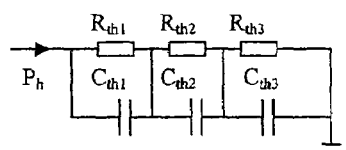
Fig. 2
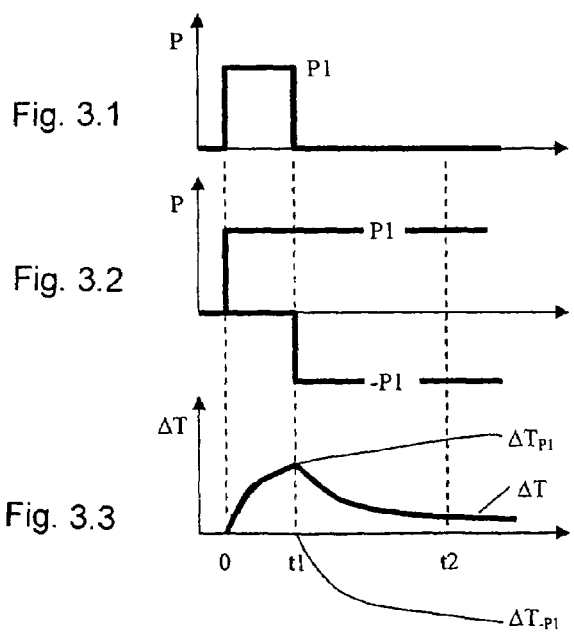
Fig. 3.1
Fig. 3.2
Fig. 3.3

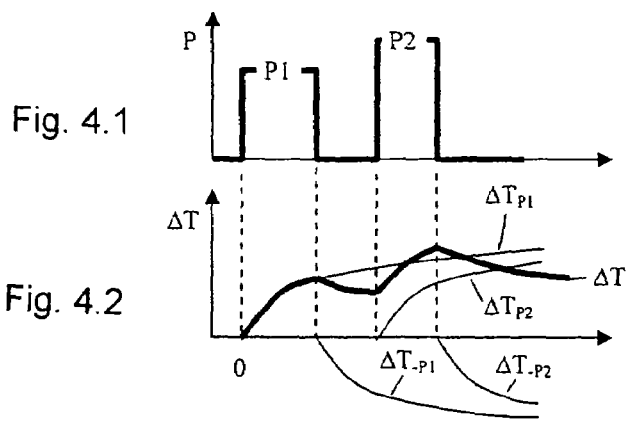
Fig. 4.1
Fig. 4.2
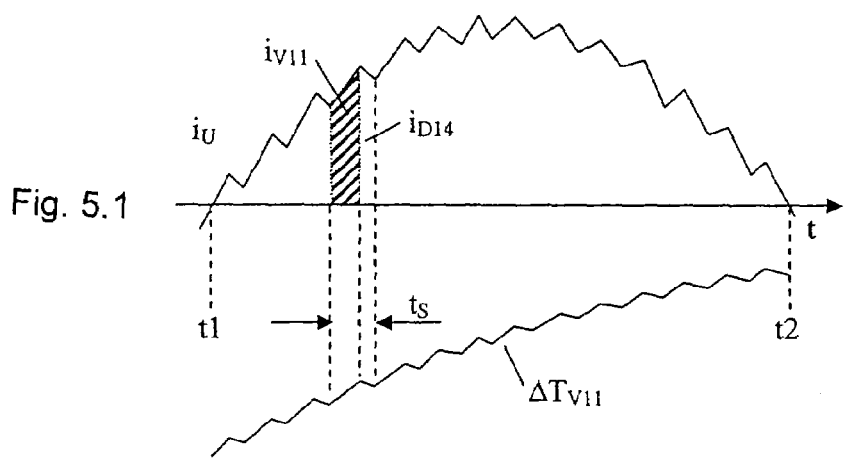
Fig. 5.1
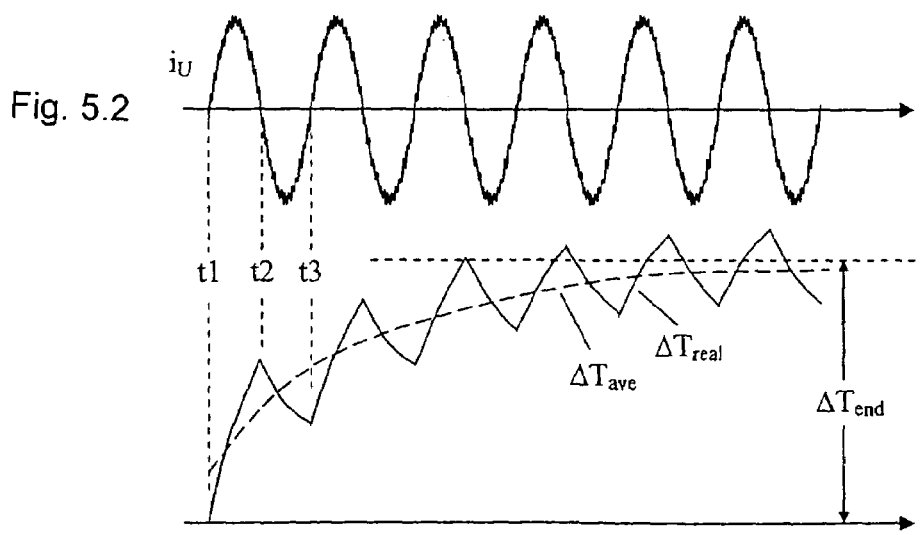
Fig. 5.2

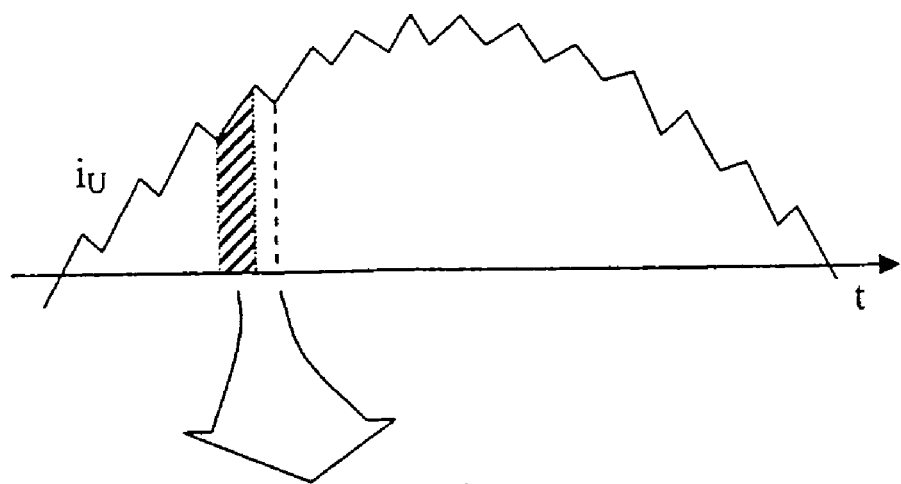
Fig. 6.1
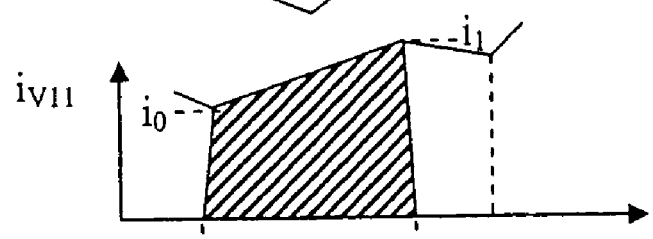
Fig. 6.2
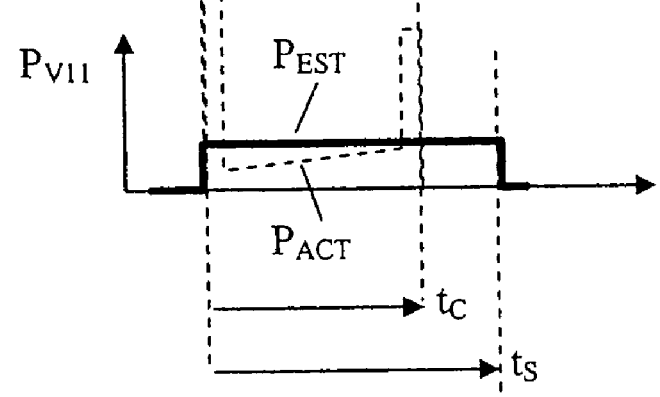
Fig. 6.3

PROTECTION OF POWER SEMICONDUCTOR COMPONENTS

The present invention relates to a method and a system for protecting the power semiconductor components, such as IGBTs, used in the power stages of power electronics devices.

The performance of a power electronics device, such as a frequency converter, is generally measured in terms of the maximum current obtained from it. The maximum current is normally determined according to the virtual junction temperature $T_j$ of the power semiconductors. In extreme conditions, the maximum semiconductor junction temperature specified by the manufacturer must not be exceeded without impairing reliable operation of the power semiconductor component and the device as a whole.

In principle, power components only deteriorate due to mechanical factors. Encapsulation of the components is generally implemented using a modular technique whereby the power semiconductor chips are attached to the surface of a copper layer placed on an insulating layer by soldering and connected with so-called bond wires to copper conductors. In this solution, large variations of the virtual junction temperature cause mechanical motion due to different thermal expansion coefficients of the materials used, which results in deterioration of the soldered and wire joints. Manufacturers therefore generally specify the service life of the modules in the form of graphs giving the number of heat cycles tolerated by the modules as a function of the range of temperature variation.

The heating of a power component between the measurable outer surface and the internal semiconductor junction results from the power dissipation occurring in it. The most significant factors affecting the power dissipation are load current and switching frequency. For example, for IGBT switches commonly used in frequency converters, the manufacturers publish data sheets with graphs from which the dissipation can be calculated as a function of these factors (dropout voltage as a function of current, and turn-on and turn-off dissipation as a function of current, voltage and control mode).

The junction temperature can not be measured directly for reasons of encapsulation, among others. To ensure a safe operating temperature, indirect methods have therefore been resorted to, generally via measurement of the cooler temperature. In this method, type tests and simulation calculations are used to determine the theoretical junction temperature as a function of the measured cooler temperature and the load of the device at one loading point at a time. It is then possible to define in the control system e.g. a programmatic maximum limit curve for the output current as a function of the measured cooler temperature and the set switching frequency.

The problem with traditional protection methods is that only a very rough guess at the actual junction temperature is obtained. For this reason, the design tends to be either overcautious or overcritical. For example, in the case of sudden loading impacts or very low motor feed frequencies, because of the thermal capacitances caused by the mechanics no conclusions can be drawn at all from the measured cooler temperature about the actual behavior of the temperature of the semiconductor junction.

Traditional protection methods also do not observe the temperature of a given individual power semiconductor, but they typically create a model of the degree of heating of an average component on the basis of a maximum current model formed from the current of all phases, and they thus only aim at indicating a theoretical maximum temperature. Therefore, e.g. at low frequencies (below 1 Hz), where the junction temperature of an individual power semiconductor may undergo even violent variations during a single cycle, this variation is not observed at all, but in principle only a maximum value selected from all the junction temperatures of the power semiconductors of the device.

In prior-art methods of protecting power semiconductors, the aim has thus been only to ensure that the specified maximum junction temperature is not exceeded. The effect of the dynamic behavior of the temperature on service life has only been taken into account in manual calculations.

The object of the present invention is to overcome the drawbacks of prior art and to achieve a completely new type of method for the protection of power semiconductor components. In the method of the invention, the intelligence and calculation capacity of the control circuits of power electronics devices, e.g. frequency converters, made to the standards of present-day technology are utilized for calculating the junction temperatures of power semiconductors in real time. Real-time calculation means that the temperature is calculated at time intervals at least equal to the shortest time constant in the thermal-network model of the component.

The advantages of knowing the junction temperature in real time include the following:

As the exact junction temperature is known, the full capacity of the device can be utilized safely in all situations e.g. via dynamic adjustment of the output current.

Reliability of the device is improved as overheat protection is applied directly to that critical part of the power electronics device which requires protection. For example, at low frequencies, where considerable temperature variation may occur during a single cycle of the output current, this provides a particularly great advantage.

In applications where the loading is of a highly cyclical nature (e.g. elevators) and therefore imposes a great strain on the junctions of the power module, the device can give a warning regarding maintenance required when the end of its service life is approaching as the safe number of thermal cycles specified for the power module is reached.

The details of the features characteristic of the protection method and protection system of the invention are presented in the claims below.

In the following, the invention will be described in detail with reference to an example and the attached drawings, wherein FIG. 1 presents a voltage-controlled PWM-frequency converter, FIG. 2 represents a thermal-network model of a power semiconductor module, FIG. 3.1–3.3 represent one dissipation power pulse and a method of calculating the heating caused by it, FIG. 4.1–4.2 represent two dissipation power pulses and a method of calculating the heating caused by them, FIG. 5.1–5.2 represent the heating of one IGBT switch caused by the output current of the frequency converter during one half-cycle and a number of cycles, FIG. 6.1–6.3 represent a current pulse of one IGBT switch of the frequency converter and the formation of dissipation energy components caused by it and uniform distribution of summed energy over the entire conduction cycle.

FIG. 1 presents a three-phase voltage-controlled PWM-frequency converter, which has a mains bridge 10 for rectifying a three-phase alternating voltage from a supply network, consisting of phase voltages $U_R$, $U_S$, $U_T$, to produce an intermediate-circuit DC voltage $U_{DC}$, and a load bridge (inverter) 11 for inverting the intermediate-circuit DC voltage to produce a variable-frequency three-phase alternating voltage consisting of phase voltages $U_U$, $U_V$, $U_W$. The load bridge 11 is a full-wave bridge in which the power semiconductor switches V11–V16 of each phase, with bypass diodes D11–D16 connected in inverse-parallel with them, are controlled by a control unit 13 by pulse-width modulation. The mains bridge 10 is an uncontrolled full-wave bridge consisting of diodes D1–D6. The frequency converter is controlled by a control unit CU, which is also provided with a unit $U_{DC}$ for measuring the intermediate circuit voltage and a unit $I_m$ for measuring the output phase currents $I_U$, $I_V$, $I_W$, which unit simultaneously measures the current flowing through the power semiconductor components.

According to the present invention, the control system of a power electronics device, especially a frequency converter, uses real-time calculation modeling the degree of heating of the junction temperature of an individual power semiconductor by a method according to a known theory as described below or by a simplified method derived from it. The final junction temperature is the sum of a measured cooler temperature and the calculated degree of heating, and the overheat protection of the device is based on the junction temperature thus modeled.

In the calculation, the control system can directly utilize the dropout voltage and switching energy graphs for the power semiconductor published by the manufacturer and stored e.g. in table format in the memory of the control system.

The thermal model for the power semiconductor module consists of a number of thermal resistances and thermal time constants of different magnitudes. The thermal model may comprise e.g. a thermal network as presented in FIG. 2, which comprises three time constants formed by thermal resistances $R_{th1}$–$R_{th3}$ and thermal capacitances $C_{th1}$–$C_{th3}$. The magnitudes of the time constants depend on the structure of the component, the order of magnitude typically varying between 1 ms–1 sec.

The heating and cooling caused by an individual rectangular power pulse are calculated in a known manner as follows (see FIG. 3.1–3.3):
1) A dissipation power pulse P1 (FIG. 3.1), whose duration is t1, is replaced by the sum of two continuous power pulses (FIG. 3.2), of which P1 starts at instant 0 and –P1 at instant t1.
2) As is known, the heating ΔT caused by the continuous power pulse P as a function of time follows the formula:

$$\Delta T(t) = P \times f_{\Delta T}(t) = P \times \sum_{i=1}^{n} Ri \times [1 - e^{-t/\tau i}] \quad (1)$$

where the terms Ri and τi are thermal resistances and thermal time constants specified by the manufacturer.
3) The maximum heating caused by the power pulse according to the example at instant t1 is obtained by substituting in the formula (1) P=P1 and t=t1. The degree of heating later at instant t2 can be calculated from the same formula as the sum of the degrees of heating caused by the positive and negative power pulses, as follows (FIG. 3.3):

$$\Delta T(t2) = P1 \times f_{\Delta T}(t2) - P1 \times f_{\Delta T}(t2-t1) \quad (2)$$

4) When the device is in operation, dissipation power pulses of different magnitudes follow each other as a continuous sequence. The overall heating caused by them is calculated according to the above example by summing the degrees of heating caused by each pulse. The principle is clarified by the example in FIG. 4.1–4.2, which presents the heating curves $\Delta T_{P1}$, $\Delta T_{-P1}$, $\Delta T_{P2}$, and $\Delta T_{-P2}$ caused by two dissipation power pulses P1 and P2 of different magnitudes and the overall heating graph ΔT obtained as their sum.

FIG. 5.1 presents a simplified example of the characteristic behavior of the heating of one semiconductor, V11, in the frequency converter presented in FIG. 1 during a cycle $t_s$ corresponding to the switching frequency and during the positive half-cycle of the phase current. As shown in the figure, the rising portions of the phase current (e.g. the shaded current column marked in the figure) flow via IGBT V11, while the falling portions of the phase current correspondingly flow through the inverse bypass diode D14. Therefore, the heating $\Delta T_{V11}$ of the IGBT increases when the current is flowing through it and decreases when no current is flowing through it. As can be inferred from FIGS. 1 and 5.1, during the negative half-cycle of the output current $I_U$ both V11 and D14 have no current flowing through them at all, and thus their degree of heating falls during that time.

FIG. 5.2 presents a corresponding characteristic example of the behavior of the heating of IGBT V11 over a longer period of time. In the example it is assumed that in the initial situation the device is in a cooled-down state and at instant t1 an output current starts flowing at constant frequency and amplitude. According to the example in FIG. 5.1, the degree of heating of the IGBT increases during the positive half-cycles of the output current (e.g. time interval t1–t2) and falls during the negative half-cycles (e.g. time interval t2–t3). The average degree of heating $\Delta T_{ave}$ increases during several cycles exponentially towards a final degree of heating $\Delta T_{end}$ corresponding to the output current in accordance with the thermal time constants of the power semiconductor. The curve $\Delta T_{real}$ represents the actual real-time behavior of the degree of heating of the IGBT, and modeling this behavior is the object of the protection method and system of the present invention. Prior-art modeling of the degree of heating corresponds primarily either to calculation of the final degree of heating or at best only to calculation of an average degree of heating.

As dissipation power pulses of different magnitudes follow each other as a continuous sequence, calculating the degree of heating perfectly according to the theory is a relatively laborious task that requires a high computing capacity. In practice, the calculation can be simplified without excessive detriment to accuracy e.g. according to the following principles applicable to a frequency converter:
1) All the dissipation energy components (turn-on energy, conducting-state dissipation energy and turn-off energy) accumulated during one conduction cycle of the semiconductor are summed, and this summed energy is assumed to have been produced from a uniform dissipation power distributed over the entire calculation period. The principle is clarified by the example in FIG. 6.1–6.3, which present one conduction cycle $t_C$ of semiconductor V11 in the frequency converter presented in FIG. 1. $P_{ACT}$ represents the actual dissipation power curve produced during the conduction cycle and $P_{EST}$ the uniform dissipation power distributed over the entire duration of the conduction cycle $t_s$, the time integral of which is the same as the time integral of $P_{ACT}$. It is possible to proceed in this way without great error because the degree of heating is an accumulation-type function, so the total energy used in the calculation is decisive. This assumption significantly facilitates the calculation because the switching frequency is generally constant, which means that the duration of the switching cycle is also constant. Thus, the exponential term according to equation (1) can be calculated beforehand for a period of time of a length corresponding to the switching cycle, so the degree of heating can be calculated by multiplication.

$$\Delta T = k_1 \times P_{EST} \quad (3)$$

Executing the multiplication requires much less computing capacity than the calculation of the exponential term. Let it be noted that the calculation period used may also be a time interval longer than one conduction cycle, because generally the duration of a conduction cycle is much shorter than the shortest time constant in the thermal network model of the component, which is why the change occurring in the degree of heating during it is small. The essential thing is to take all the current pulses that have occurred during the calculation period into account in the calculation of dissipation. It is also possible that the conduction cycle is longer than the calculation period, e.g. when the output current of the frequency converter is the largest possible (6-step operation).

2) To calculate the dissipation power produced during one switching cycle ($t_s$), the motor current can be assumed to remain constant during the entire conduction cycle (average value $i_{ave}=(i_0+i_1)/2$), (see FIG. 6.2). The higher the switching frequency used, the better is the validity of this assumption. After a dropout voltage curve (threshold value $V_{CEO}$ and forward resistance $r_{CE}$) and switching energy curves ($E_{ON}$ and $E_{OFF}$) for the power semiconductor have been modeled for the control system e.g. by using parameters, the average dissipation power $P_{EST}$ produced during one switching cycle can be calculated as follows:

$E_{ON}=f(i_{ave}, U_{dc})$ (from turn-on energy curve on the data sheet)

$E_{OFF}=f(i_{ave}, U_{dc})$ (from turn-off energy curve on the data sheet)

$U_{ON}=V_{CEO}+r_{CE}*i_{ave}$ ($V_{CEO}$ and $r_{CE}$ obtained from data sheet) (4)

$E_{COND}=U_{ON}*i_{ave}*t_C$ (conduction time $t_C$ obtained from control circuits) (5)

$P_{EST}=(E_{ON}+E_{OFF}+E_{COND})/t_s$ (6)

3) On the cooling curve following the power pulse, exponential calculations can be replaced with multiplications by using pre-calculated coefficients defined for multiples of the calculation period. For example, the heating caused by a power pulse P1 of a duration equal to the calculation period $t_s$ after the lapse of five calculation periods from the beginning of the power pulse can be calculated by determining on the basis of equation (2) a coefficient $k_5$ (negative number) that describes how much the heating decreases during the 4calculation period following the end of the power pulse, by multiplying the magnitude of the power pulse by this coefficient and adding the result to the previous heating result as follows:

$$\Delta T(5 \times t_s) = k_5 \times P1 + \Delta T(4 \times t_s) \quad (7)$$

When the exact behavior of the junction temperature is known, the control system can keep a record of the temperature variations (heat cycles), compare their number to the maximum numbers of cycles specified by the manufacturer, which have been fed into the control system, and issue a warning when their number (=expected service life of the power semiconductor) reaches the full count.

The junction temperature can also be displayed directly in degrees e.g. on the control panel of the frequency converter.

It is obvious to the person skilled in the art that different embodiments of the invention are not limited to the example described above, but that they may be varied within the scope of the claims presented below. Thus, the same method can be applied e.g. in the mains bridges of frequency converters, in the calculation of the heating of diodes, etc.

The invention claimed is:

1. A method for protecting the power semiconductor components used in the power stages of power electronics devices, such as frequency converters,
   which uses calculation modeling the degree of heating of the semiconductor junction of the power components (V11–V16), wherein the degree of heating of the power components between the measurable outer surface or cooler and the internal semiconductor junction is determined on the basis of the dissipation power and a thermal network model of the component,
   wherein the temperature of the outer surface of the power component or the temperature of the cooler is measured,
   wherein the modeled temperature of the semiconductor junction is the sum of the measured temperature of the outer surface or cooler and the calculated degree of heating, and
   wherein, based on the modeled junction temperature, an alarm is issued or some other protective action is taken,
   characterized in that, in the method:
   the temperature of the semiconductor junction is calculated in real time, at least at time intervals equal to the shortest time constant in the thermal network model, on the basis of the heating caused by the dissipation power pulse produced during each current conduction cycle ($t_C$).

2. A method according to claim 1,
   characterized in that, in the method
   the variations of the semiconductor junction temperature (heat cycles) are monitored, their number is compared to maximum numbers of cycles specified by the manufacturer and fed into the control system, and an alarm is issued or some other protective action is taken when the number of cycles reaches the full count.

3. A method according to claim 1,
   characterized in that, in the method:
   calculation of the degree of heating is carried out at constant calculation intervals ($t_s$), the length of which is at least equal to the shortest time constant in the thermal network model.

4. A method according to claim 1,
   characterized in that, in the method:
   during the calculation interval ($t_s$), the dissipation power of the power semiconductor is assumed to remain constant ($P_{EST}$), where the dissipation energy ($P_{EST}*t_s$) caused by the said dissipation power is the same as the actual dissipation energy ($E_{COND}$) calculated on the basis of the response characteristics of the power component during the same calculation interval.

5. A method according to claim 1,
   characterized in that, in the method:
   the calculation of changes in the degree of heating is based on the use of coefficients ($k_1$, $k_5$) calculated beforehand and tabulated in the control system, which coefficients have been calculated on the basis of power semiconductor-specific time constants and the constant calculation interval.

6. A method according to claim 2, characterized in that, in the method:

during the calculation interval ($t_s$), the dissipation power of the power semiconductor is assumed to remain constant ($P_{EST}$), where the dissipation energy ($P_{EST}*t_s$) caused by the said dissipation power is the same as the actual dissipation energy ($E_{COND}$) calculated on the basis of the response characteristics of the power component during the same calculation interval.

7. A method according to claim 3, characterized in that, in the method:

the calculation of changes in the degree of heating is based on the use of coefficients ($k_1$, $k_5$) calculated beforehand and tabulated in the control system, which coefficients have been calculated on the basis of power semiconductor-specific time constants and the constant calculation interval.

8. A method according to claim 4, characterized in that, in the method:

the calculation of changes in the degree of heating is based on the use of coefficients ($k_1$, $k_5$) calculated beforehand and tabulated in the control system, which coefficients have been calculated on the basis of power semiconductor-specific time constants and the constant calculation interval.

9. A system (CU) for controlling the power semiconductor components used in the power stages of power electronics devices, especially frequency converters, which uses calculation modeling the degree of heating of the semiconductor junction of the power components (V11–V16), wherein the degree of heating of the power components between the measurable outer surface or cooler and the internal semiconductor junction is determined on the basis of the dissipation power and a thermal network model of the component, wherein the temperature of the outer surface of the power component or the temperature of the cooler is measured, wherein the modeled temperature of the semiconductor junction is the sum of the measured temperature of the outer surface or cooler and the calculated degree of heating, and wherein, based on the modeled junction temperature, an alarm is issued or some other protective action is taken, characterized in that it calculates the temperature of the semiconductor junction in real time, at least at time intervals equal to the shortest time constant in the thermal network model, on the basis of the heating caused by the dissipation power pulse produced during each current conduction cycle ($t_C$).

10. A system according to claim 9, characterized in that it monitors the variations of the semiconductor junction temperature (heat cycles), compares their number to maximum numbers of cycles specified by the manufacturer and fed into the control system, and issues an alarm or performs some other protective action when the number of cycles reaches the full count.

11. A control system according to claim 9, characterized in that the frequency converter or equivalent has a display, on which display the temperature of the semiconductor junction of an individual power component can be indicated directly in degrees.

* * * * *